United States Patent

[11] 3,548,883

| [72] | Inventor | Felix Cohen |
| | | Denver, Colo. |
| [21] | Appl. No. | 716,015 |
| [22] | Filed | Mar. 26, 1968 |
| [45] | Patented | Dec. 22, 1970 |
| [73] | Assignee | The Colorado Paper Products Corp. |
| | | Denver, Colo. |
| | | a corporation of Colorado |

[54] SELF-SUSTAINING PAPER-TYPE LAMINAR TUBING
10 Claims, 3 Drawing Figs.

[52] U.S. Cl. .................................................. 138/143, 138/144
[51] Int. Cl. .................................................. F16l 9/14
[50] Field of Search ........................................... 138/118- —153, 172, 177, 178, Metal Foil, Glass Fiber; 220/(Inquired); 156/(Inquired); 164/(Inquired)

[56] References Cited
UNITED STATES PATENTS

| 505,561 | 9/1893 | Shearer .......................... | 138/144 |
| 1,948,007 | 2/1934 | Putnam .......................... | 138/144 |
| 2,798,510 | 7/1957 | Martin et al. .................. | 138/144 |
| 2,877,150 | 3/1959 | Wilson .......................... | 138/144 |
| 3,424,204 | 1/1969 | Sato .............................. | 138/144 |
| 3,451,433 | 6/1969 | Cunningham et al. ........ | 138/144 |

Primary Examiner—Houston S. Bell, Jr.
Attorney—McGrew and Edwards

ABSTRACT: Paper-type laminar tubing formed from plurality of spirally wound strips bonded into a unitary structure including inner support composed of fibrous material and outer moisture-proof pliable reinforced cover member having thermoplastic film coated on underside with tacky bituminous material to provide cohesive bond between overlapping wraps and seal inner support from exterior conditions resulting in self-sustaining structure.

PATENTED DEC 22 1970

3,548,883

INVENTOR.
Felix Cohen
BY
McGrew and Edwards
ATTORNEYS

SELF-SUSTAINING PAPER-TYPE LAMINAR TUBING

This invention relates to paper-type spirally wound tubular bodies having particular laminar arrangements.

Paper tubing formed by one or a plurality of spirally wound layers or plies has heretofore been suitable for a variety of applications and especially for receptacles for a variety of rolled sheet materials and the like. The term "paper" as used herein refers to any of a variety of available fibrous materials exhibiting a degree of stiffness and capable of being formed into rolled strips of material and being wrapped in a spiral winding to form tubular shapes. Such paper tubing has several advantages over other available forms of tubing, such as metal tubing, in that it is lightweight, has good acoustical and insulation characteristics and it may be easily formed by winding into a variety of diameters and lengths on relatively inexpensive automatic or semiautomatic machinery with a minimum of trained personnel. In the past, the uses of such paper tubing have been somewhat limited because of its resistance to moisture or other solvents, its resistance to corrosive environments such as bacteria, fungus, abrasion, rodents and the like, as well as limitations on its mechanical strength or self sustaining properties under substantial static and dynamic load stresses.

Accordingly, it is an object of this invention to provide a lightweight, self-sustaining spirally wound tubular body which may be easily formed in a variety of diameters and lengths.

Another object of this invention is to provide an essentially paper-type tubular body which is corrosive resistant, moisture proof and self sustaining under a variety of load or stress conditions such as when buried in the earth.

It is still a further object of this invention to provide a spirally wound composite tubular body, a substantial portion of which is formed of a fibrous or paper-type material but having sufficient tensile strength and insulation properties to make it suitable for duct applications for the transfer of air or like gases and the like.

Other objects, advantages and capabilities of the present invention will be more apparent as the description proceeds taken in conjunction with the accompanying drawings in which.

Figure 1:
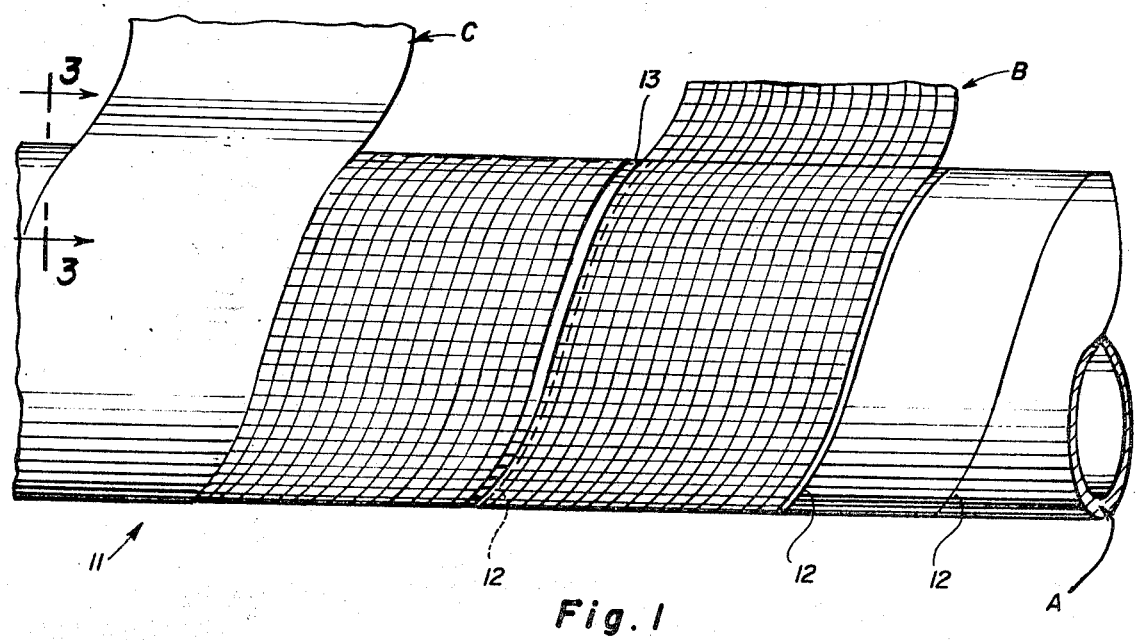
FIG. 1 is an elevation view of a section of a laminar tubular body embodying features of the present invention with portions of the layers unwrapped to more clearly illustrate the details of construction and manner of assembly into a composite body.

Referring now to the drawings, there is shown a section or length of tubing having a particular combination of spirally wound layers selected for the purposes of illustrating the features of the present invention which is generally designated by numeral 11. In general, this tubing or tubular body shown for illustration purposes comprises an inner support portion or layer means A, an intermediate portion or layer means B wrapped on the inner support portion A and an outer cover portion or layer means C wrapped over the intermediate portion B. Each of these portions is preferably formed using pliable strips of material of a pre-selected width and wrapping them in a spiral wrap under a suitable tension or pressure in a manner which is conventional practice in forming spirally wound paper tubing.

By way of background, one conventional procedure for such a wrapping to form spirally wound tubular bodies includes the delivery of material furnished as one or a plurality of rolled strips of a preselected width onto a stationary mandrel. This mandrel has associated therewith a flat belt supported from and driven by a pair of rollers above and below the mandrel and makes one turn around the mandrel. This belt overlaps the strips of material as they wind onto the mandrel and causes them to rotate around the mandrel to form successive layers of a tubular body which is continuously rotating and progressively advancing. When the strip of material is a paper material, an adhesive is usually applied to its undersurface strip prior to being engaged by the flat belt, and the edges of each successive convolution of each strip are in abutting or closely spaced rather than overlapping relation.

In a preferred practice, the inner support portion, designated A, for most applications will be a paper tubing containing at least one and preferably a plurality of spirally wound layers to form a stiff inner support and usually will be a substantial portion of the thickness of the entire body. The edges of each successive convolution of the outer layer of inner portion A are shown in abutting relation in the drawings at 12.

In the particular form shown in the drawings, there is wrapped upon this essentially paper tubing, a layer of fabric mesh, which layer preferably has a substantial spacing between successive wraps designated 13 and overlies the abutting edges 12 of the outer layer of portion A.

Figure 2:
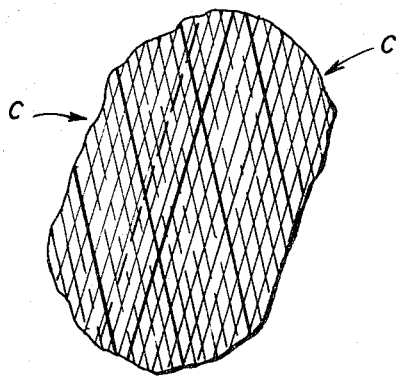
FIG. 2 is an enlarged fragmentary view of the outer layer of material showing the overlapping relationship of adjoining wraps.

The final or outer cover portion C is then spirally wrapped in a manner similar to the paper strips upon this intermediate portion or layer and each succeeding wrap is preferably in an overlapping relation to the previous wrap as is more fully illustrated in FIG. 2. This outer cover means has an adhesive surface or coating on its underside and with the wrapping procedure under pressure as above described, is bonded to the top surface of the adjoining wrap to provide an intimate cohesive bond to seal the inner layers of portions A and B from the exterior conditions and, in addition, provides a substantial stiffening effect for the integral body which greatly increases its tensile strength and results in essentially a self-sustaining unitary tubular body.

Figure 3:
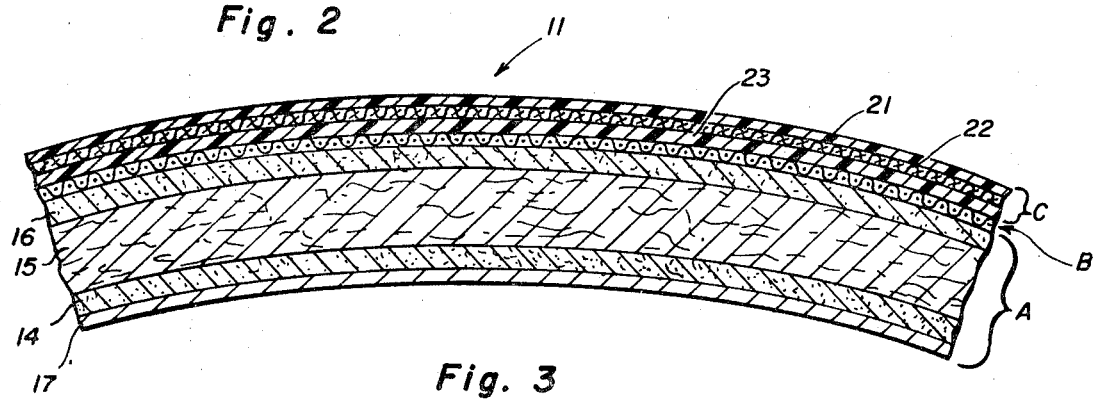
FIG. 3 is a sectional view taken along lines 3-3 of FIG. 1 showing one form of combination of wraps or lamination which is especially suitable for air duct applications.

The tubular body 11 illustrated in the drawings which is especially suited for use as a duct for transferring air to rooms in a building or the like has inner support portion A of laminar spirally wound construction comprising an inner layer or wrap of fibrous asbestos material 14, an intermediate layer or wrap of paperboard material 15 and a third or outermost layer or wrap 16 of fibrous asbestos material. It is understood that paperboard material 15 may be used for some applications without the wraps of asbestos material. The intermediate layer 15 may be a single wrap or a plurality of wraps such as three plies of paperboard. There is also shown in FIG. 3 as an optional layer an innermost layer 17 which preferably may be a thin spirally wound metal foil to further increase the heat insulation qualities of the tubular assembly.

The intermediate portion B is shown as a single wrap or layer of lesser width than the wrap 16 and in a preferred construction is an essentially nonpliable glass fabric of the linoweave type of a thickness of on the order of several mils.

The outer cover portion C in one preferred construction shown is a three layer arrangement comprising an outer layer 21, an intermediate layer 22, and an inner layer 23 which are bonded together as a unitary strip or tape. This outer cover portion may be constructed of a variety of combination materials which will provide the several required environment resistant properties which includes being water impervious and corrosion resistant. In addition, it must be sufficiently pliable so as to be capable of being shaped into rolls and applied in cold form like a tape in the same manner used with similar machinery as the paper strips for ease in manufacture.

An example of preferred materials for outer cover portion C is to use for layer 21 a thin plastic film composed of a thermoplastic material selected from the group consisting of polyethylene, polypropylene and polyvinyl chloride. The intermediate layer is a flexible or pliable glass fabric and is optional for added strength if desired. The inner layer 23 may be a bituminous material such as coal tar or asphalt which is essentially tacky in nature at normal room temperature so as to be suitable for cold application and will adhere to the outer layer 21 and form a strong bond therewith when it is placed in the overlapping relation to the adjoining wrap as is shown in FIG. 2. More specifically, a suitable coating or adhering layer 23 preferably is sufficiently self sustaining so as to be capable of being worked as by calendering into a layer of substantially uniform thickness. This is to be distinguished from, for example, a rubber base adhesive which is not self sustaining apart from the outer film layer 21. One example of such a layer 23 is a mixture or blend of an aromatic hydrocarbon derivative of coal or petroleum, polyvinyl chloride and a plasticizing ingredient therefor. The hydrocarbon material will form a major portion by weight of the layer 23, as, for example, on the order of 60 to 90 parts per 100 parts. The plasticizing ingredient may be creosote oil and coumarone indene resin.

For illustration purposes, the typical tubular section as shown in FIG. 1 has an outside diameter of about 6⅝ inches and the combined thickness of the outer cover portion C is somewhat more or less than 26 mils with the inner paper portion A being about three-eighth inch thick. The plastic film layer 21 is essentially a thin film material on the order of 1 to 10 mils.

From the foregoing description, it is apparent that tubing constructed in accordance with the present invention has a wide range of uses as flow conducting conduits or ducts to transfer low pressure gases, and to transfer air for the heating or cooling of buildings or to supply atmospheric air to underground areas such as mines. Further uses are as moisture-proof enclosures for direct burial lines, such as for telephone wire or cable, TV cable and the like and as moisture-proof enclosures for insulating steam lines and water lines, both above ground and under the ground.

I claim:

1. An essentially paper-type laminar tubular body having layer components bonded into an integral structure comprising: inner layer means forming a stiff inner support of generally tubular shape containing fibrous material, said inner layer means including at least one spirally wound layer of paper material; intermediate layer means wrapped on the outer surface of said inner layer means, said intermediate layer means being formed of fabric mesh; and outer layer means forming a water-impervious outer cover and reinforcing member for said inner and intermediate layer means, said outer layer means including at least one layer of spirally wound film composed of a thermoplastic material having portions of each succeeding wrap in overlapping relation to the previous wrap, said outer layer means having an adhesive surface on its underside to provide a strong cohesive bond between adjoining wraps of said outer layer means whereby to seal the inner and intermediate layer means from exterior conditions and provide a substantial increase in the tensile strength of the self sustaining tubular body formed.

2. An essentially paper-type laminar tubular body as set forth in claim 1, wherein said inner layer means constitutes a substantial portion of the thickness of the tubular body and is comprised of at least three plies of fibrous material.

3. An essentially paper-type laminar tubular body as set forth in claim 1, wherein said thermoplastic film is a thermoplastic material selected from the group consisting of polyethylene, polypropylene and polyvinyl chloride.

4. An essentially paper-type laminar tubular body as set forth in claim 1, wherein said adhesive surface on said outer layer means is a self-supporting layer of material containing an aromatic hydrocarbon derivative.

5. An essentially paper-type laminar tubular body as set forth in claim 1, wherein said adhesive surface on the underside of said outer layer means is sufficiently tacky at room temperatures so as to be cold-applied onto said intermediate layer means and said intermediate layer means is formed of a glass fabric mesh.

6. An essentially paper-type laminar tubular body as set forth in claim 1, wherein said outer layer means is substantially 26 mils in thickness.

7. An essentially paper-type laminar tubular body as set forth in claim 1, wherein said film is less than 10 mils in thickness.

8. An essentially paper-type laminar tubular body as set forth in claim 1, wherein said inner layer means has a spirally wound layer of thin metal foil on its inner surface.

9. An essentially paper-type laminar tubular body as set forth in claim 1, wherein said outer layer means includes an intermediate layer of glass fiber for increasing the strength of the body.

10. An essentially paper-type laminar tubular body as set forth in claim 1, wherein said inner layer means constitutes a substantial portion of the thickness of the tubular body.